(12) United States Patent
Dong et al.

(10) Patent No.: US 10,721,944 B2
(45) Date of Patent: Jul. 28, 2020

(54) BEATER DEVICE WITH BAFFLE SUPPORTING ARRANGEMENT FOR CARBONATED BEVERAGE APPARATUS

(71) Applicants: Lingyu Dong, Temple City, CA (US); Chundong Dong, Temple City, CA (US)

(72) Inventors: Lingyu Dong, Temple City, CA (US); Chundong Dong, Temple City, CA (US)

( * ) Notice: Subject to any disclaimer, the term of this patent is extended or adjusted under 35 U.S.C. 154(b) by 99 days.

(21) Appl. No.: 15/990,671

(22) Filed: May 27, 2018

(65) Prior Publication Data

US 2019/0357565 A1 Nov. 28, 2019

(51) Int. Cl.
| | |
|---|---|
| *A23G 9/16* | (2006.01) |
| *A23G 9/22* | (2006.01) |
| *B01F 7/08* | (2006.01) |
| *B01F 7/00* | (2006.01) |
| *B01F 15/00* | (2006.01) |

(52) U.S. Cl.
CPC .............. *A23G 9/16* (2013.01); *A23G 9/224* (2013.01); *B01F 7/00208* (2013.01); *B01F 7/00433* (2013.01); *B01F 7/086* (2013.01); *B01F 15/00915* (2013.01); *B01F 2015/0011* (2013.01); *B01F 2215/0021* (2013.01)

(58) Field of Classification Search
CPC .. A23G 9/16; A23G 9/00; A23G 9/224; B01F 7/00208; B01F 7/00433; B01F 15/00915; B01F 2015/0011; B01F 2215/0021; B01F 7/00; B01F 7/00008; B01F 7/043; B01F 7/002; B01F 7/00233; B01F 7/00291; B01F 7/0025; B01F 7/00275; B01F 7/00316

See application file for complete search history.

(56) References Cited

U.S. PATENT DOCUMENTS

| | | | | |
|---|---|---|---|---|
| 5,074,125 A | * | 12/1991 | Schifferly | A23G 9/224 366/312 |
| 2006/0070394 A1 | * | 4/2006 | Boyer | A23G 9/045 62/392 |
| 2017/0367370 A1 | * | 12/2017 | Frisque | A23G 9/12 |

* cited by examiner

*Primary Examiner* — Emmanuel E Duke
(74) *Attorney, Agent, or Firm* — Raymond Y. Chan; David and Raymond Patent Firm

(57) ABSTRACT

A carbonated beverage apparatus includes a freezing cylinder for receiving a mixture, a beater device disposed inside the freezing cylinder for pushing the mixture in a spiral manner from an inlet of the freezing cylinder to an outlet thereof, and a baffle supporting arrangement positioned surrounded by the beater device, wherein the beater device is rotatable to remove the mixture from an inner wall of the freezing cylinder radially back into the freezing cylinder and to stir the mixture via the baffle supporting arrangement before flowing out of the outlet.

20 Claims, 7 Drawing Sheets

BEATER DEVICE WITH BAFFLE SUPPORTING ARRANGEMENT FOR CARBONATED BEVERAGE APPARATUS

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to food production mechanism, and more particularly to a beater device with a baffle supporting arrangement for carbonated beverage apparatus.

Description of Related Arts

Frozen beverage, such as ice cream, has been popular for decades around the world, which is made from mixture of dairy products, fruits or other ingredients and flavors with ice. The conventional mixing machine is driven by electrical motor to stir the mixture to be evenly mixed without large sized ice.

However, the material of beverage is hard to be well-distributed with the churn paddles of the conventional mixing machine. Since the size of different ingredients are vary from qualities between the materials, all kinds of the ingredients are difficult to be smashed into same sized pieces as required.

Accordingly, the conventional mixing machine only provides a rotating force along the driving axis, so the mixture is pushed to move along the axis, just like going straight along the axis in different radius. So the mixture has little chance to be crashed into pieces. On the other hand, the conventional mixing machine is easily to get frosted on the inner wall of the canister or on outer surface of elements inside the machine when dealing with freezing beverage. Especially, the conventional mixing machine is in complex structure and has multidirectional edges to be stocked with large-sized ingredients which are fertile breeding grounds for bacteria. What is more, the conventional mixing machine provides a baffle extended along the driving axis so that the baffle has to be suffered against the rotating force to wear out as time passed by. So the conventional mixing machine is facing corrosion which will cause hygienic problem to the mixture of food.

Another problem of the conventional mixing machine is that most of the mixture is only driven to move not to mix. Because the mixture needs to be forced for distributing all kinds of ingredient and ice, the mixture usually is crashed on the wall of the mixing machine which has more space to be smashed rather than the baffle. So the conventional mixing machine is shaking itself while working which will damage the machine eventually.

Therefore, the mixing efficiency is required to be higher for more evenly mixing and the hygienic healthy has to be ensure during mixing food.

SUMMARY OF THE PRESENT INVENTION

The invention is advantageous in that it provides a beater device with a baffle supporting arrangement for carbonated beverage apparatus, which is capable of stirring a plurality of ingredients in an inner spiral manner to mix and smash for making the carbonated beverage, such as frozen mixture, sufficiently.

Another advantage of the invention is to provide a beater device with a baffle supporting arrangement for carbonated beverage apparatus, which comprises a freezing cylinder controlled by a chilling system to freeze the mixture inside the freezing cylinder while the mixture flowed from an inlet to an outlet in an inner spiral manner.

Another advantage of the invention is to provide a beater device with a baffle supporting arrangement for carbonated beverage apparatus, which comprises a stirring pusher disposed in the freezing cylinder to mix and smash evenly for making the beverage mixture.

Another advantage of the invention is to provide a beater device with a baffle supporting arrangement for carbonated beverage apparatus, wherein the stirring pusher is capably of constantly removing the frozen ingredients from an inner wall of the freezing cylinder back into the mixture to be smashed.

Another advantage of the invention is to provide a beater device with a baffle supporting arrangement for carbonated beverage apparatus, wherein the stirring pusher is adapted to be flushed with rinse water or to be cleaned without detaching apart.

Another advantage of the invention is to provide a beater device with a baffle supporting arrangement for carbonated beverage apparatus, wherein the stirring pusher further comprises a beater device and a baffle supporting arrangement to smash the ingredients of the mixture while pushing the mixture move from the inlet to the outlet.

Another advantage of the invention is to provide a beater device with a baffle supporting arrangement for carbonated beverage apparatus, wherein the beater device is driven by a motor to be rotated inside the freezing cylinder and the baffle supporting arrangement is blocked the flowing path of the ingredients, so all kinds of the ingredients can be broken up into piece.

Another advantage of the invention is to provide a beater device with a baffle supporting arrangement for carbonated beverage apparatus, wherein the baffle supporting arrangement is not directly extended along the driving axis of the motor to decrease abrasion of suffering against the rotating force.

Another advantage of the invention is to provide a beater device with a baffle supporting arrangement for carbonated beverage apparatus, wherein the beater device is shaped with continuous surfaces which avoid to be stocked with large-sized ingredients.

Another advantage of the invention is to provide a beater device with a baffle supporting arrangement for carbonated beverage apparatus, wherein the beater device further comprises a scraper blade detachably mounted on a supporting frame to remove the ingredients from the inner wall of the freezing cylinder to avoid frosting and wasting.

Another advantage of the invention is to provide a beater device with a baffle supporting arrangement for carbonated beverage apparatus, wherein the mixture is mainly crashed on the baffle supporting arrangement to diminish the vibration effectively.

Additional advantages and features of the invention will become apparent from the description which follows, and may be realized by means of the instrumentalities and combinations particular point out in the appended claims.

According to the present invention, the foregoing and other objects and advantages are attained by a carbonated beverage apparatus, comprising:

a freezing cylinder which comprises an inlet and an outlet for feeding and serving a mixture, wherein the mixture is a carbonated beverage mixture;

a beater device disposed inside the freezing cylinder to push the mixture in an inner spiral manner from the inlet to the outlet; and a baffle supporting arrangement positioned surrounded by the beater device, wherein the freezing cylinder has an inner wall, wherein the beater device is rotatable to remove the mixture from the inner wall back into the freezing cylinder to stir the mixture before flowing out of the outlet.

According to one embodiment of the present invention, the mixture moves along the freezing cylinder while being chilled from the inlet to the outlet and along the direction of from the inner wall to the baffle supporting arrangement.

According to one embodiment of the present invention, the beater device further comprises a supporting frame, a helical paddle and a scraper blade, wherein the helical paddle is fixed on the supporting frame, wherein the scraper blade is detachable mounted on the supporting frame, wherein the supporting frame is driven by a motor to be rotated to push the mixture by the helical paddle.

According to one embodiment of the present invention, the scraper blade is supported to press against the inner wall of the freezing cylinder.

According to one embodiment of the present invention, the baffle supporting arrangement has a first end and a second end, wherein the first end is received in one end of the freezing cylinder, wherein the second end is statically disposed respectively on the supporting frame.

According to one embodiment of the present invention, the baffle supporting arrangement comprises at least two latticed units, wherein each of the latticed units is circled by at least two bumped arms, and the each of the latticed units has at least one radial window for the mixture passing through.

According to one embodiment of the present invention, the adjacent two latticed units are orthogonal with each other.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1A:
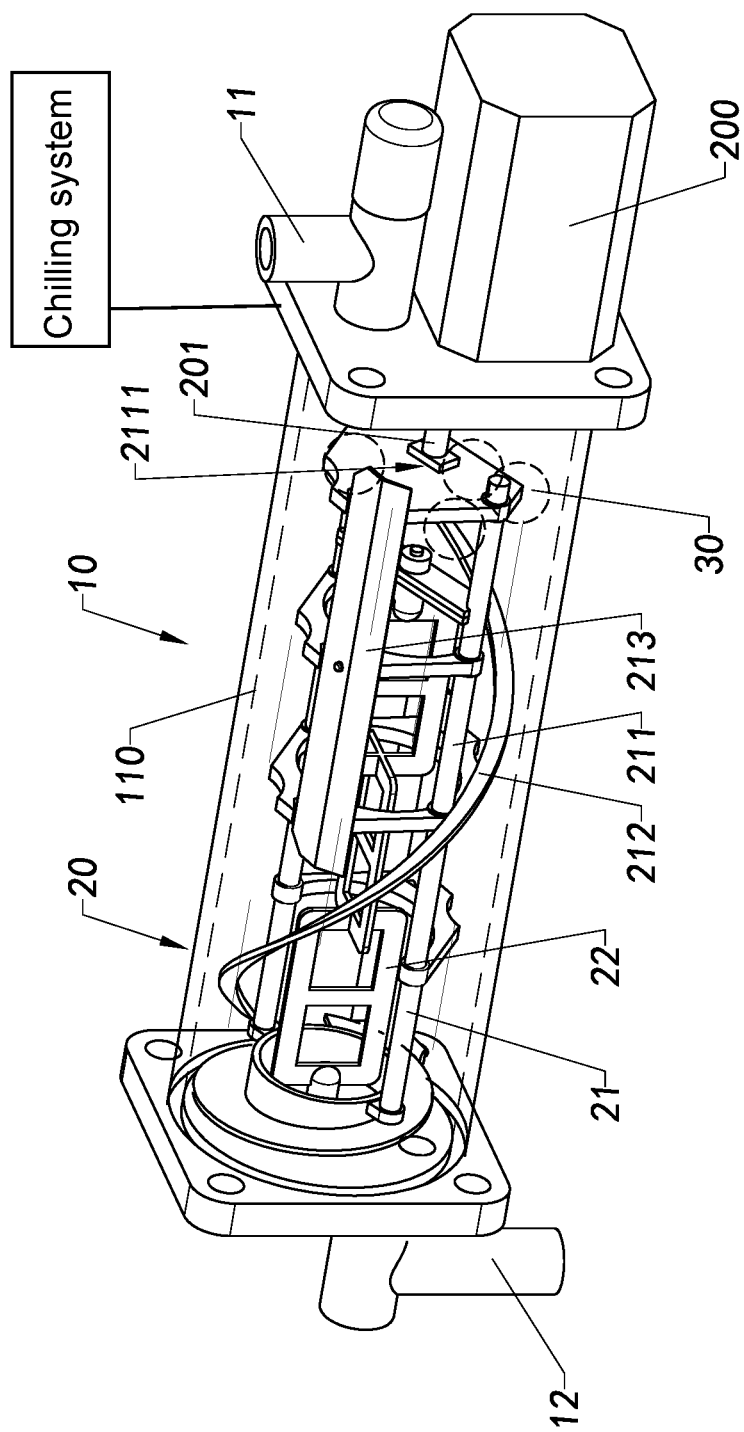
FIG. 1A is a perspective view of a beater device with a baffle supporting arrangement for carbonated beverage apparatus according to a preferred embodiment of the present invention.

The present invention provides a frozen beverage mixing arrangement, as shown in FIG. 1A to FIG. 6, which is controlled by a chilling system to make frozen beverage. As shown in FIGS. 1A and 1B, the frozen beverage mixing arrangement comprises a freezing cylinder 10 and a stirring pusher 20 disposed inside the freezing cylinder 10 to drive, push and mix a mixture 30 from an inlet 11 to an outlet 12 in an inner spiral manner. In particular, the mixture 30 is a frozen carbonated beverage mixture. Furthermore, the stirring pusher 20 is driven by a motor 200 to be rotated in the freezing cylinder 10 along a driving axis 201 of the stirring pusher 20 which is the same as the centerline axis of the freezing cylinder 10. When the stirring pusher 20 is rotating, the mixture 30 is being pushed to move from the inlet 11 to the outlet 12. And as the outlet 12 is opened, the mixture 30 is served as frozen beverage flowing out of the mixing arrangement.

Figure 1B:
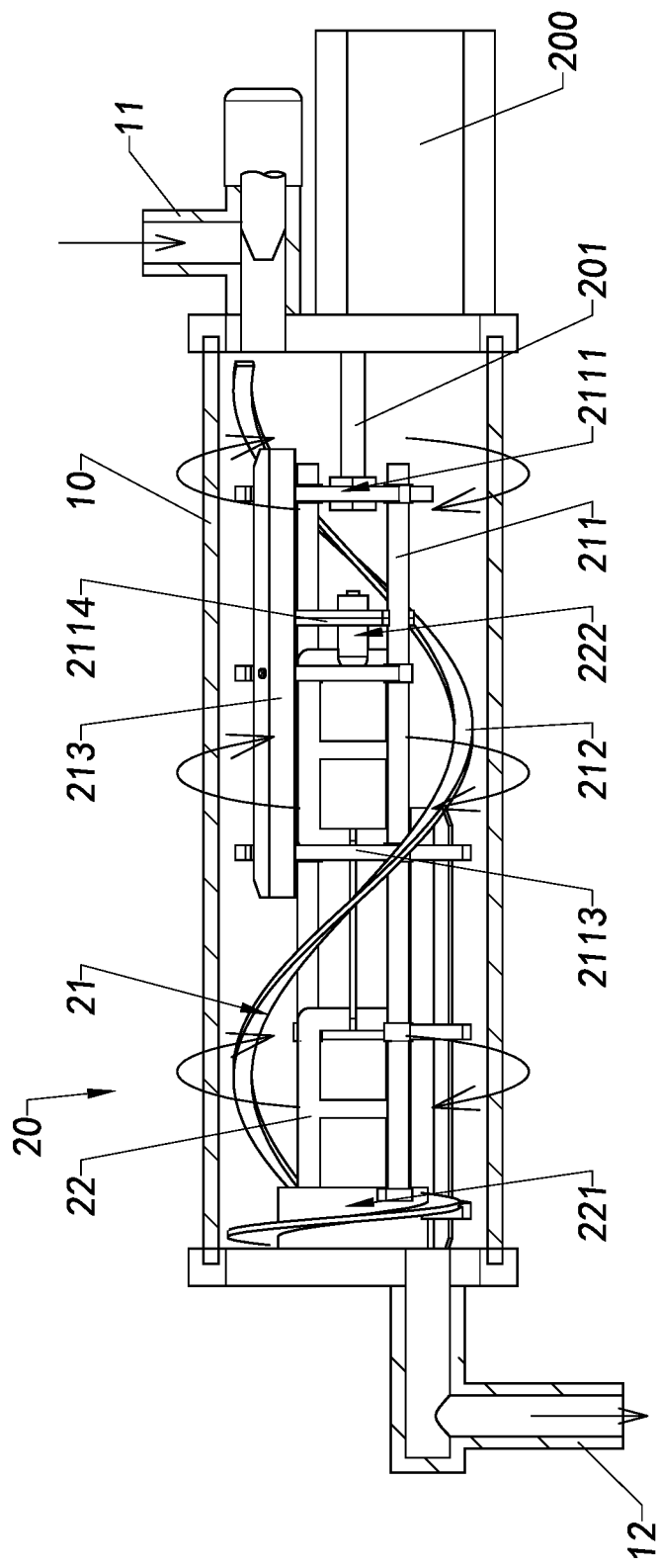
FIG. 1B is a sectional view of the beater device with a baffle supporting arrangement for carbonated beverage apparatus according to the preferred embodiment of in the present invention.

As shown in FIGS. 1A and 1B, the stirring pusher 20 further comprises a beater device 21 and a baffle supporting arrangement 22 positioned surrounded by the beater device 21. The mixture 30 is pushed towards the baffle supporting arrangement 22 to be crashed on the baffle supporting arrangement 22. So the mixture 30 is stirred evenly to smash large ingredients or large ice and the mixture 30 becomes thicker as flowing to the outlet 12. And the stirring pusher 20 has less corners or edges which is adapted to be flushed with rinse water or to be cleaned without detaching apart. Accordingly, the beater device 21 is arranged to radially stir and move the mixture 30 from a peripheral portion of the freezing cylinder 10 to a center portion thereof, while the baffle supporting arrangement 22 is arranged to stir the mixture 30 within the center portion of the freezing cylinder 10.

Furthermore, the freezing cylinder 10 is firstly fed with ingredients of the mixture 30 which is flowed inside the freezing cylinder 10 with being mixed into the mixture 30. The freezing cylinder 10 has an inner wall 110 touched by the stirring pusher 20. As the mixture 30 is chilled and tends to attach on the inner wall 110, which is willing to get frost on the inner wall 110, the mixture 30 is capable of being moved from the inner wall 110 back into the freezing cylinder 10. So the stirring pusher 20 pushes the mixture 30 to move forwards and inwards in the freezing cylinder 10.

The mixture 30 injected from the inlet 11 is pushed to move in the inner spiral manner by the beater device 21. The mixture 30 moves along the freezing cylinder 10 while being chilled from the inlet 11 to the outlet 12 and along the direction of from the inner wall 110 to the baffle supporting arrangement 22 inside the beater device 21. So the mixture 30 is moving along an inner spiral line pushed by the beater device 21, and the baffle supporting arrangement 22 is blocked the flowing path of the mixture 30 to evenly mix and smash to make the frozen beverage.

What is more, the beater device 21 further comprises a supporting frame 211, a helical paddle 212 and a scraper blade 213, wherein the helical paddle 212 is fixed on the supporting frame 211 in order to be rotated to push the mixture 30 moving, wherein the scraper blade 213 is detachable mounted on the supporting frame 211. The helical paddle 212 is rotated with the supporting frame 211 to form a pushing force to the mixture 30 inside the freezing cylinder 10. It is worth mentioning that the helical paddle 212 of the beater device 21 does not touch the inner wall 110 of the freezing cylinder 10. The scraper blade 213 is arranged to contact or touch the inner wall 110 so that the helical paddle 212 hardly wear out against the freezing cylinder 10. And the mixture 30 is flowing between the helical paddle 212 and the inner wall 110 and into the inside helical paddle 212 to the baffle supporting arrangement 22.

Figure 2:
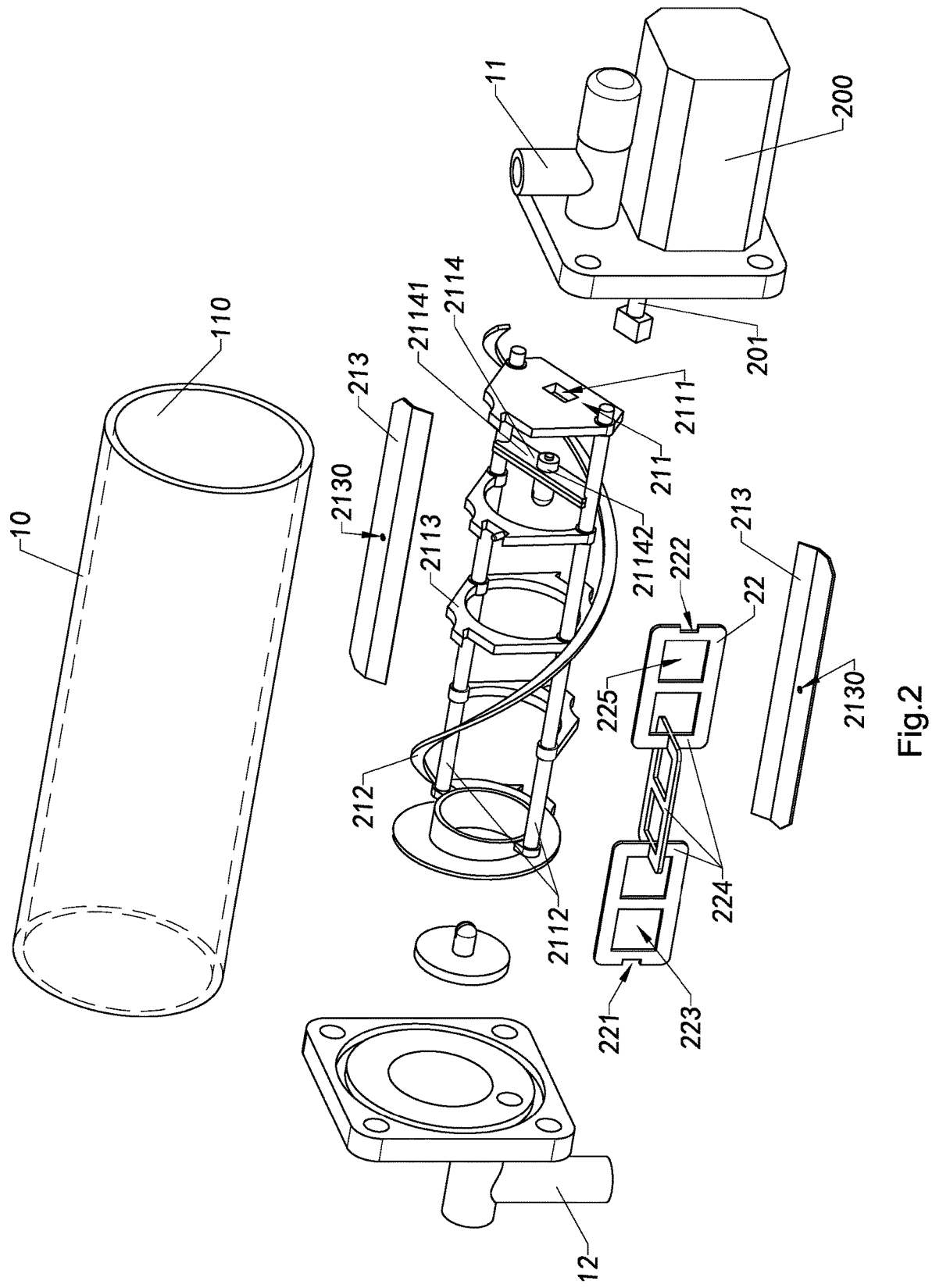
FIG. 2 is an exploded view of the beater device with a baffle supporting arrangement for carbonated beverage apparatus according to the above preferred embodiment of the present invention.
Figure 3:
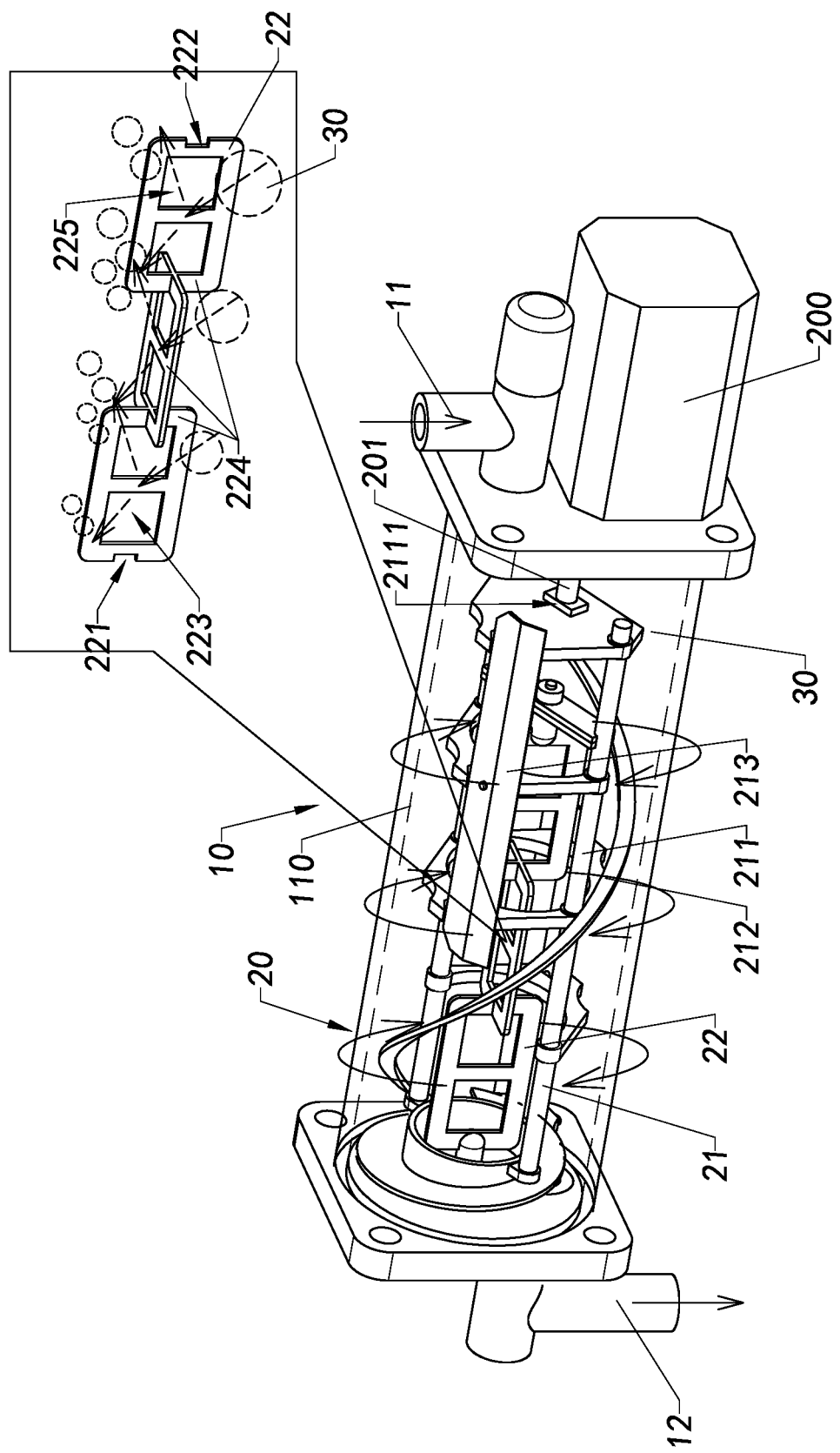
FIG. 3 illustrates an operation of the beater device with a baffle supporting arrangement for carbonated beverage apparatus according to the above preferred embodiment of the present invention.

As shown in FIG. 2, the scraper blade 213 is supported to contact the inner wall 110 of the freezing cylinder 10. When the supporting frame 211 is rotated, the scraper blade 213 is moved to press against the inner wall 110 so that the mixture 30 attached on the inner wall 110 is capable of being removed. Not only the mixture 30 attached on the inner wall 110, the mixture 30 near the inner wall 110 is capable of being radially moved to inside of the freezing cylinder 10 and to the baffle supporting arrangement 22 inside the beater device 21, as shown in FIG. 3.

Furthermore, the supporting frame 211 further comprises at least two elongated rods or members 2112 extended parallelly along the freezing cylinder 10, at least one arched connector 2113 fixed between the elongated rods 2112, and a driven end 2111 formed on one of the end of the elongated rod 2112. The driven end 2111 is connected to the motor 200 to drive the elongated rods 2112. The arched connector 2113 is connected one of the elongated rod 2112 to another elongated rod 2112 so that the elongated rods 2112 is stably secured with each other while rotating. And the arched connector 2113 is adapted to enhance the position between the elongated rods 2112 and decrease retention of the mixture 30. Since the arched connector 2113 and elongated rods 2112 have continuous surfaces, the mixture 30 is hardly to be stocked inside the supporting frame 211.

As shown in FIG. 2, as the supporting frame 211 is driven by the motor 200 from the driven end 2111, the scraper blade 213 is moved along and pressed against the inner wall 110. The mixture 30 attached on the inner wall 30 is likely to be frosted with ice on the inner wall 110. The scraper blade 213 is rotated to press on the whole inner wall 110 in a circle. The scraper blade 213 may not remove the mixture 30 once a time, and may slightly adjust the angle between the scraper blade 213 and the supporting frame 211. When the scraper blade 213 is rotated to shave a little of the frost mixture 30 in a rotating circle, the scraper blade 213 is continued to be rotated. When the scraper blade 213 is rotated to push the mixture 30 around and around, the mixture 30 will be removed from the inner wall 110. When the mixture 30 having a larger size is attached on the inner wall 110, the scraper blade 213 is capable of gradually removing the mixture 30 with the scraper blade 213 hold in a gripping slot on the arched connector 2113. The frosted mixture 30 may be shaved little by little or be shaken around by around. It is worth to mention that the scraper blade 213 is retained in the gripping slot with the mounting hole 2130 inserted with a projection extended from the gripping slot. The gripping slot provides adjustable movement for the scraper blade 213 with the projection positioning the scraper blade 213. The scraper blade 213 is adjustably pivoted around the projection in the embodiment to have different angles in the gripping slot. It is also easy to mount the scraper blade 213 into the gripping slot by looping in the projection. The radius of scraping circle of the scraper blade 213 is fine-tuning while rotating against the inner wall 110 to scrap the frosted mixture 30.

The beater device 21 moves the mixture 30 from the inlet 11 to the outlet 12 by the helical paddle 212 and from the inner wall 110 to the center of the freezing cylinder 10 by the scraper blade 213. Especially, the beater device 21 is forced on mixing and pushing the mixture 30 in the freezing cylinder 10. The baffle supporting arrangement 22 inside the beater device 21 is blocked the flowing path of the mixture 30 so as to smash the ingredients of mixture 30 into pieces and stir the ingredients of mixture 30 back again to evenly mix the mixture 30. Thus, the mixture 30 is moving along the inner spiral line pushed by the beater device 21 and bumped into the baffle supporting arrangement 22.

The baffle supporting arrangement 22 has a first end 221 and a second end 222, as shown in FIG. 3, wherein the first end 221 is received in one end of the freezing cylinder 10, wherein the second end 222 is statically disposed on the supporting frame 211 respectively. In other words, the baffle supporting arrangement 22 is stationary while the beater device 21 is rotated. When the supporting frame 211 is rotated driven by the motor 200, the baffle supporting arrangement 22 is static respective to the supporting frame 211. In order words, the supporting frame 211 is rotated around the baffle supporting arrangement 22, and the first end 221 and the second end 222 of the baffle supporting arrangement 222 is retained static against the freezing cylinder 10. The beater device 21 is connected to the driving axis 201 rotatably powered by the motor 200 while the baffle supporting arrangement 22 is independent from the driving axis 201 that the baffle supporting arrangement 22 is not connected to the driving axis 201. The supporting frame 211 further comprises a holder 2114 connected between the elongated rods 2112. The second end 222 of the baffle supporting arrangement 22 is disposed in the holder 2114, which is indirectly connected to the motor 200. Thus the baffle supporting arrangement 22 is less suffered friction with the motor 200 to sustain long life-time. The holder 2114 provides relatively static with the supporting frame 211 when rotating.

Furthermore, the baffle supporting arrangement 22 comprises at least two, preferably three, latticed units 223, wherein each of the latticed unit 223 is circled by at least two bumped arms 224. Each of the latticed units 223 has two radial windows 225 framed by the bumped arms 224. The bumped arms 224 are static during stirring the mixture 30 which is pushed to flow in the inner spiral manner and has to be crashed into the bumped arm 224 inside the beater device 21. According to the embodiment, the bumped arm 224 is preferably shaped into plate board which provides large surface to be bumped so that the mixture 30 has more chances to be crashed. Preferably, the adjacent two latticed units 223 are orthogonal with each other so that the mixture 30 is passed through at least two of the latticed units 233 while flowing from the inlet 11 to the outlet 12. The mixture 30 is smashed into pieces by the baffle supporting arrangement 22 and fairly well-distributed to be increasingly thick.

Figure 4:
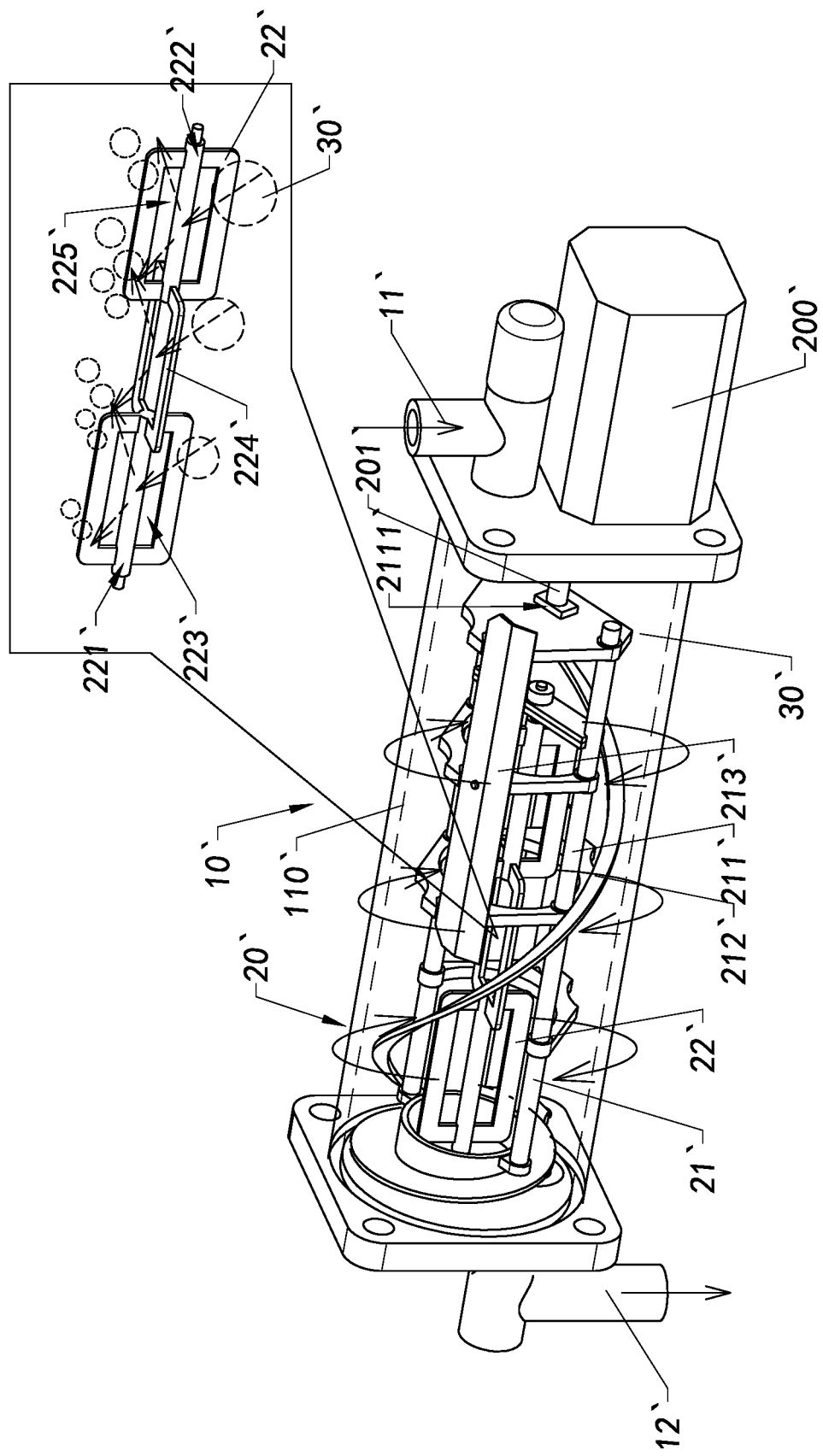
FIG. 4 is a perspective view of an alternative mode of the baffle supporting arrangement according to the above preferred embodiment of the present invention.
Figure 5:
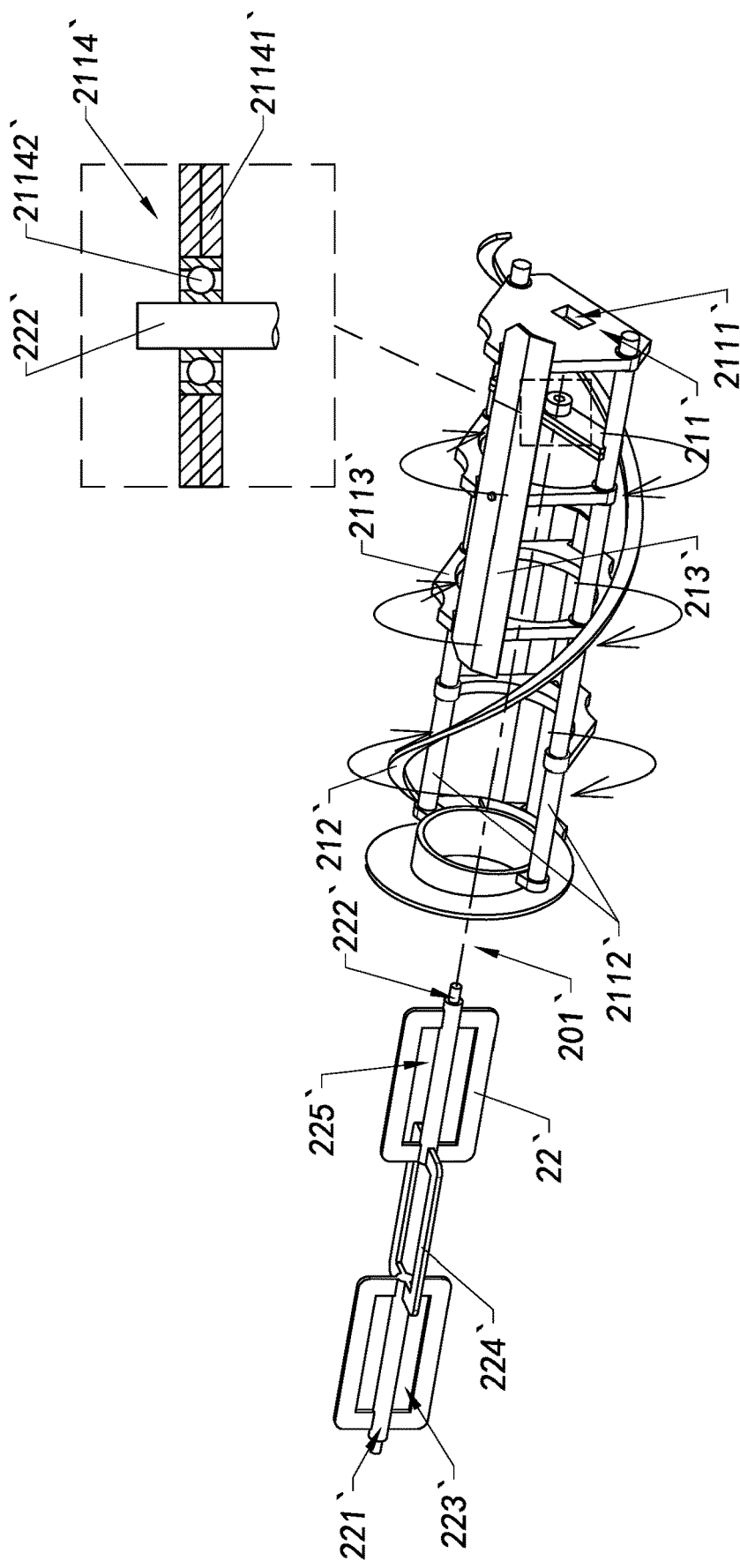
FIG. 5 is an exploded view of the alternative mode of the beater device with the baffle supporting arrangement for carbonated beverage apparatus according to the above preferred embodiment of the present invention.

An alternative mode of the stirring pusher 20' of frozen beverage mixing arrangement according to the above preferred embodiment of the present invention is illustrated as in FIGS. 4 and 5. The stirring pusher 20' comprises a beater device 21' which is similar with the beater device 21 according to above embodiment, and a baffle supporting arrangement 22' arranged inside the beater device 21'.

The baffle supporting arrangement 22' is shaped differently from the above embodiment, which the baffle supporting arrangement 22' has different size radial windows 225' surrounded by the bumped arm 224' which is in L-shape. In the embodiment, the bumped arm 224' further is supported and connected by a center rod. But the center rod is not a whole long stick though the baffle supporting arrangement 22' so that the radial windows 225' are in different size to randomly make block for better mixing. The baffle supporting arrangement 22' has a first end 221' received in one end of the freezing cylinder 10' and a second end 222' disposed on the supporting frame 211'. When the supporting frame 211' is rotated driven by the motor 200', the second end 222' is retained statically respective to the supporting frame 211'. The second end 222' has a groove to connect to the supporting frame 211'. And the supporting frame 211' is rotated in the groove of the second end 222' without rotating the baffle supporting arrangement 22'. Therefore, the baffle supporting arrangement 22' is indirectly connected to the motor 200' to decrease friction and abrasion against the motor 200'. Furthermore, the bumped arm 224' of the baffle supporting arrangement 22' is similarly shaped as ladder for better stability to the supporting frame 211'. Even if the baffle supporting arrangement 22' is not connected with the supporting frame 211', the baffle supporting arrangement 22' is capable of being supported inside the beater device 21'.

Furthermore, the holder 2114' comprises a holding frame 21141' and a bearing 21142' as shown in FIG. 5, wherein the holding frame 21141' is connected the bearing 21142' with the elongated rods 2112' so as to support the bearing 21142' and the second end 222' near the driven end 2111' of the supporting frame 211'. The second end 222' of the baffle supporting arrangement 22' is holding in the center of the bearing 21142', and the whole bearing 21142' is supported by the holding frame 21141'. As the supporting frame 211' is rotating along the driving axis 201', the second end 222' of the baffle supporting arrangement 22' is kept static in the bearing 21142' of the holder 2114'. In order words, the bearing 21142' transforms rotation from the holding frame 21141', the supporting frame 211' or the motor 200' into satiation of the second end 222' of the baffle supporting arrangement 22'. Therefore, the mixture 30' is moved in the inner spiral manner to be crashed on the baffle supporting arrangement 22' for evenly mixing. The mixture 30' is pushed inside to bumped into the baffle supporting arrangement 22' to be smaller pieces, and be flushed out of the baffle supporting arrangement 22', and be pushed by the beater device 21' back to the baffle supporting arrangement 22', which is a flowing cycle of the mixture 30'. After several flowing cycles around the baffle supporting arrangement 22', the mixture 30' is pushed from the inlet 11' to the outlet 12' to be prepared as frozen beverage.

Figure 6:
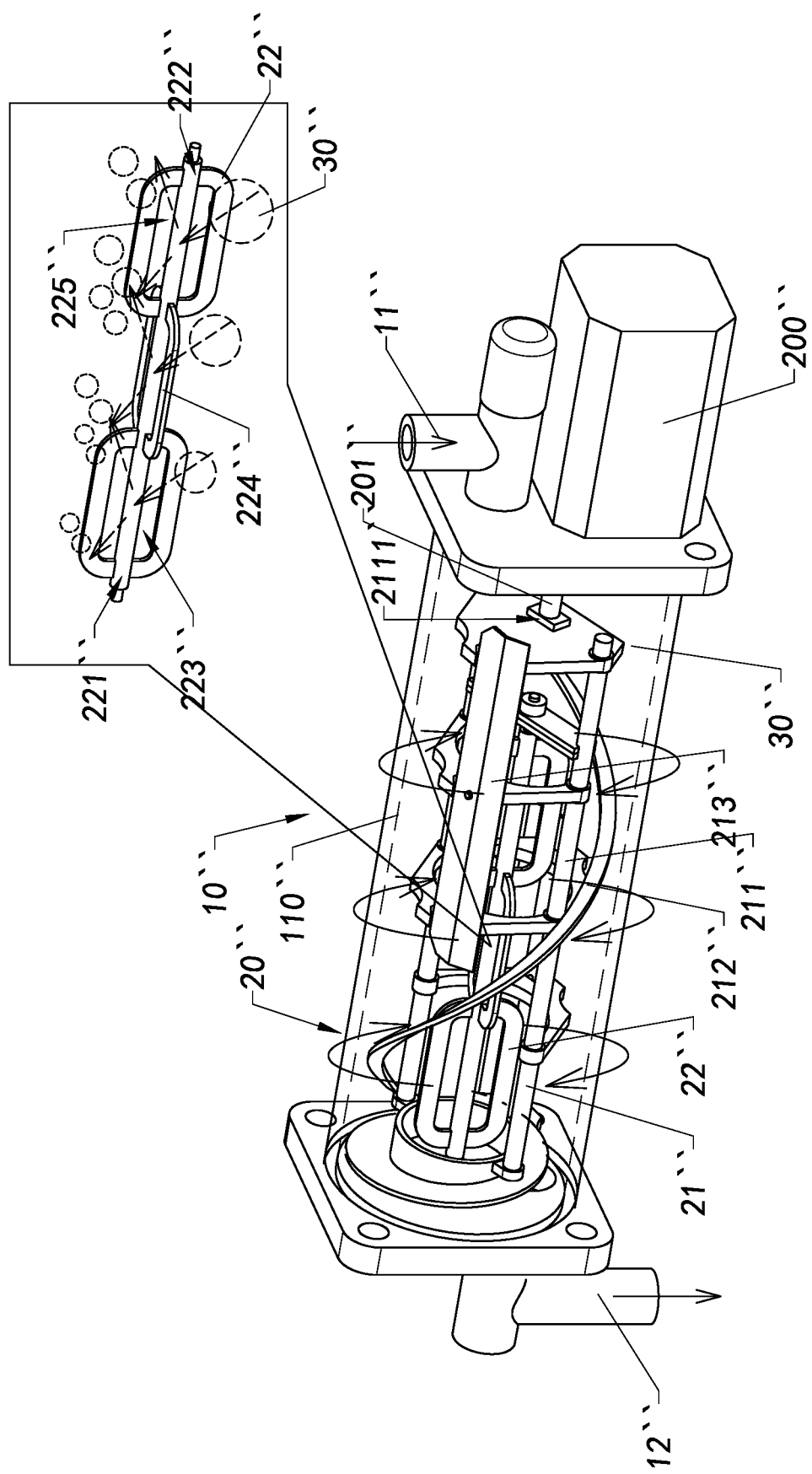
FIG. 6 is a perspective view of another alternative mode of the beater device with a baffle supporting arrangement for carbonated beverage apparatus according to the above preferred embodiment of the present invention.

Another alternative mode of the baffle supporting arrangement 22" is illustrated in FIG. 6. The bumped arms 224" are C-shaped to form the radial windows 225" in D-shaped to be at least four latticed units 223". The corner of the windows 225" is rounded to avoid being filled with the mixture 30". It is worth to mention that the baffle supporting arrangement 22" is also static against the rotating beater device 21" while the stirring pusher 20" is rotating to push the mixture 30" from the inlet 11" to the outlet 12". According to the embodiment, the baffle supporting arrangement 22" has six windows 225" radially opened for flowing through the mixture 30". The mixture 30" is crashed into the bumped arms 224", then passed through the radial windows 225". The mixture 30" become more smooth and in smaller pieces in inner spiral flowing path.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A carbonated beverage apparatus, comprising:
a freezing cylinder, which comprises an inner wall, an inlet and an outlet, arranged for receiving a mixture;
a beater device disposed inside the freezing cylinder, wherein said beater device comprises a supporting frame being driven to rotate and a helical paddle coupled at the supporting frame for pushing the mixture in a spiral manner from the inlet to the outlet; and
a baffle supporting arrangement, which is positioned surrounded by the beater device, comprising three or more latticed units coupled with each other and orthogonal with each other, wherein each of the latticed units comprises a plurality of bumped arms and a plurality of radial windows framed by the bumped arms for allowing the mixture passing through the radial windows.

2. The carbonated beverage apparatus, as recited in claim 1, wherein each of the latticed units has two of the radial windows framed by the bumped arms, such that the baffle supporting arrangement has at least six of the radial windows.

3. The carbonated beverage apparatus, as recited in claim 2, wherein each of the bumped arms is a plate board to enlarge a surface thereof for bumping with the mixture.

4. The carbonated beverage apparatus, as recited in claim 2, wherein the baffle supporting arrangement has a first end defined at one of the latticed units and a second end defined at another latticed unit, wherein the first end of the baffle supporting arrangement is received in one end of the freezing cylinder, wherein the second end of the baffle supporting arrangement is stationary disposed on the supporting frame, such that the baffle supporting arrangement is stationary when the beater device is rotated.

5. The carbonated beverage apparatus, as recited in claim 1, wherein the radial windows have different sizes.

6. The carbonated beverage apparatus, as recited in claim 5, wherein each of the bumped arms is a plate board to enlarge a surface thereof for bumping with the mixture.

7. The carbonated beverage apparatus, as recited in claim 5, wherein the baffle supporting arrangement has a first end defined at one of the latticed units and a second end defined at another latticed unit, wherein the first end of the baffle supporting arrangement is received in one end of the freezing cylinder, wherein the second end of the baffle supporting arrangement is stationary disposed on the supporting frame, such that the baffle supporting arrangement is stationary when the beater device is rotated.

8. The carbonated beverage apparatus, as recited in claim 1, wherein the baffle supporting arrangement further comprises at least a center rod, wherein at least one of the latticed units is constructed by the bumped arms and the center rod while at least one of the latticed unit is only constructed by the bumped arms.

9. The carbonated beverage apparatus, as recited in claim 8, wherein each of the bumped arms is a plate board to enlarge a surface thereof for bumping with the mixture.

10. The carbonated beverage apparatus, as recited in claim 8, wherein the baffle supporting arrangement has a first end defined at one of the latticed units and a second end defined at another latticed unit, wherein the first end of the baffle supporting arrangement is received in one end of the freezing cylinder, wherein the second end of the baffle supporting arrangement is stationary disposed on the supporting frame, such that the baffle supporting arrangement is stationary when the beater device is rotated.

11. The carbonated beverage apparatus, as recited in claim 1, wherein corners of the radial window are rounded.

12. The carbonated beverage apparatus, as recited in claim 11, wherein each of the bumped arms is a plate board to enlarge a surface thereof for bumping with the mixture.

13. The carbonated beverage apparatus, as recited in claim 11, wherein the baffle supporting arrangement has a first end defined at one of the latticed units and a second end defined at another latticed unit, wherein the first end of the baffle supporting arrangement is received in one end of the freezing cylinder, wherein the second end of the baffle supporting arrangement is stationary disposed on the supporting frame, such that the baffle supporting arrangement is stationary when the beater device is rotated.

14. The carbonated beverage apparatus, as recited in claim 1, wherein each of the bumped arms is a plate board to enlarge a surface thereof for bumping with the mixture.

15. The carbonated beverage apparatus, as recited in claim 14, wherein the baffle supporting arrangement has a first end defined at one of the latticed units and a second end defined at another latticed unit, wherein the first end of the baffle supporting arrangement is received in one end of the freezing cylinder, wherein the second end of the baffle supporting arrangement is stationary disposed on the supporting frame, such that the baffle supporting arrangement is stationary when the beater device is rotated.

16. The carbonated beverage apparatus, as recited in claim 15, wherein the supporting frame has a driven end connected to a motor to drive the supporting frame to rotate.

17. The carbonated beverage apparatus, as recited in claim 14, wherein the supporting frame has a driven end connected to a motor to drive the supporting frame to rotate.

18. The carbonated beverage apparatus, as recited in claim 1, wherein the baffle supporting arrangement has a first end defined at one of the latticed units and a second end defined at another latticed unit, wherein the first end of the baffle supporting arrangement is received in one end of the freezing cylinder, wherein the second end of the baffle supporting arrangement is stationary disposed on the supporting frame, such that the baffle supporting arrangement is stationary when the beater device is rotated.

19. The carbonated beverage apparatus, as recited in claim 18, wherein the supporting frame has a driven end connected to a motor to drive the supporting frame to rotate.

20. The carbonated beverage apparatus, as recited in claim 1, wherein the supporting frame has a driven end connected to a motor to drive the supporting frame to rotate.

* * * * *